United States Patent
Tanaka et al.

(10) Patent No.: US 7,365,809 B2
(45) Date of Patent: Apr. 29, 2008

(54) STEREOSCOPIC IMAGE DISPLAY DEVICE HAVING NEGATIVE PRESSURE REGIONS WITHIN

(75) Inventors: Shinichiro Tanaka, Tottori (JP); Yoshiaki Aramatsu, Tottori (JP)

(73) Assignees: Sanyo Electric Co., Ltd., Osaka (JP); Tottori Sanyo Electric Co., Ltd., Tottori (JP)

( * ) Notice: Subject to any disclaimer, the term of this patent is extended or adjusted under 35 U.S.C. 154(b) by 221 days.

(21) Appl. No.: 10/550,619

(22) PCT Filed: Mar. 24, 2004

(86) PCT No.: PCT/JP2004/004003

§ 371 (c)(1), (2), (4) Date: Sep. 26, 2005

(87) PCT Pub. No.: WO2004/086127

PCT Pub. Date: Oct. 7, 2004

(65) Prior Publication Data

US 2007/0019119 A1  Jan. 25, 2007

(30) Foreign Application Priority Data

Mar. 25, 2003 (JP) ............................. 2003-082897
Mar. 25, 2003 (JP) ............................. 2003-082898

(51) Int. Cl.
*G02F 1/1335* (2006.01)
(52) U.S. Cl. ..................... 349/15; 349/58; 349/161
(58) Field of Classification Search ............... 349/15
See application file for complete search history.

(56) References Cited

U.S. PATENT DOCUMENTS 5,644,373 A * 7/1997 Furushima et al. ......... 349/158
5,945,965 A * 8/1999 Inoguchi et al. ............... 345/6

(Continued)

FOREIGN PATENT DOCUMENTS

EP          432831          6/1991

(Continued)

OTHER PUBLICATIONS

Patent Abstracts of Japan for JP 03-251822, published Nov. 11, 1991.

(Continued)

*Primary Examiner*—Andrew Schechter
*Assistant Examiner*—John Heyman
(74) *Attorney, Agent, or Firm*—Katten Muchin Rosenman LLP (57) ABSTRACT

A stereoscopic image display device 30 comprising a backlight 32, a liquid crystal display panel 36, a liquid crystal parallax barrier 44, and a spacer member 40 arranged between the liquid crystal display panel 36 and the liquid crystal parallax barrier 44, in which the spacer member 40 is made of a glass material different from that of the glass substrates 36a, 36b constituting the liquid crystal display panel 36, and the spacer member 40 is a glass substrate having a thermal expansion coefficient larger than that of the glass substrates 36a, 36b constituting the liquid crystal display panel 36. More specifically, it is preferable that the spacer member 40 consist of a soda glass substrate and that the liquid crystal display panel 36 for display be formed of non-alkali glass. With this constitution, it is possible to provide a stereoscopic image display device, which can be used as a large-sized stereoscopic image display device by means of the liquid crystal parallax barrier method, with good display quality and where due consideration has been given to the thermal expansion of the substrate caused by heat generated by the backlight, and the manufacturing method therefor.

5 Claims, 5 Drawing Sheets

U.S. PATENT DOCUMENTS

| | | | |
|---|---|---|---|
| 6,055,013 A * | 4/2000 | Woodgate et al. | 348/59 |
| 6,094,216 A | 7/2000 | Taniguchi et al. | |
| 6,437,915 B2 * | 8/2002 | Moseley et al. | 359/465 |
| 6,483,567 B1 * | 11/2002 | Okada | 349/158 |

FOREIGN PATENT DOCUMENTS

| | | |
|---|---|---|
| EP | 744872 | 11/1996 |
| JP | 3-119889 | 5/1991 |
| JP | 03-119889 A | 5/1991 |
| JP | 03-241317 | 10/1991 |
| JP | 03-241317 A | 10/1991 |
| JP | 03-251822 | 11/1991 |
| JP | 03-251822 A | 11/1991 |
| JP | 6-11703 | 1/1994 |
| JP | 06-11703 A | 1/1994 |
| JP | 7-92936 | 4/1995 |
| JP | 07-92936 A | 4/1995 |
| JP | 9-74574 | 3/1997 |
| JP | 09-74574 A | 3/1997 |
| JP | 9-258191 | 10/1997 |
| JP | 10-54977 | 2/1998 |
| JP | 10-54977 A | 2/1998 |
| JP | 10-78562 | 3/1998 |
| JP | 10-078562 A | 3/1998 |
| JP | 2001-228465 | 8/2001 |
| JP | 2001-228465 A | 8/2001 |
| JP | 09-258191 A | 3/2006 |

OTHER PUBLICATIONS

Patent Abstracts of Japan for JP 06-011703, published Jan. 21, 1994.
Patent Abstracts of Japan for JP 09-258191, published Jan. 3, 1997.
Patent Abstracts of Japan for JP 03-241317, published Oct. 28, 1991.
Patent Abstracts of Japan for JP 2001-228465, published Aug. 24, 2001.
Patent Abstracts of Japan for JP 10-054977, published Feb. 24, 1998.
Patent Abstracts of Japan for JP 03-119889, published May 22, 1991.
Patent Abstracts of Japan for JP 07-092936, published Apr. 7, 1995.
Patent Abstracts of Japan for JP 09-074574, published Mar. 18, 1997.
Patent Abstracts of Japan for 10-078562, published Mar. 24, 1998.
Patent Abstracts of Japan for JP 09-258191, published Oct. 3, 1997.
International Search Report mailed May 18, 2004.

* cited by examiner

STEREOSCOPIC IMAGE DISPLAY DEVICE HAVING NEGATIVE PRESSURE REGIONS WITHIN

This application is a national stage entry under 35 U.S.C. §371 of PCT/JP04/04003, filed Mar. 24, 2004, (designating the U.S.; and which published in Japanese in WO 2004/086127 on Oct. 7, 2004), which claims the benefit of Japanese Patent Application Nos. 2003-082897 and 2003-082898, both filed Mar. 25, 2003, incorporated herein by reference.

TECHNICAL FIELD

The present invention relates to a stereoscopic image (picture) display device based on a liquid crystal parallax barrier system, which is capable of stereoscopic image display without using special glass and more specifically, to a stereoscopic image display device where consideration is given to the thermal expansion of the substrate caused by heat generated by a backlight, and the method of manufacturing the device.

BACKGROUND ART

The known conventional methods of displaying stereoscopic images without using special glass are the lenticular method, the parallax barrier method, and a method in which a light source is formed in the shape of slits.

Figure 4:
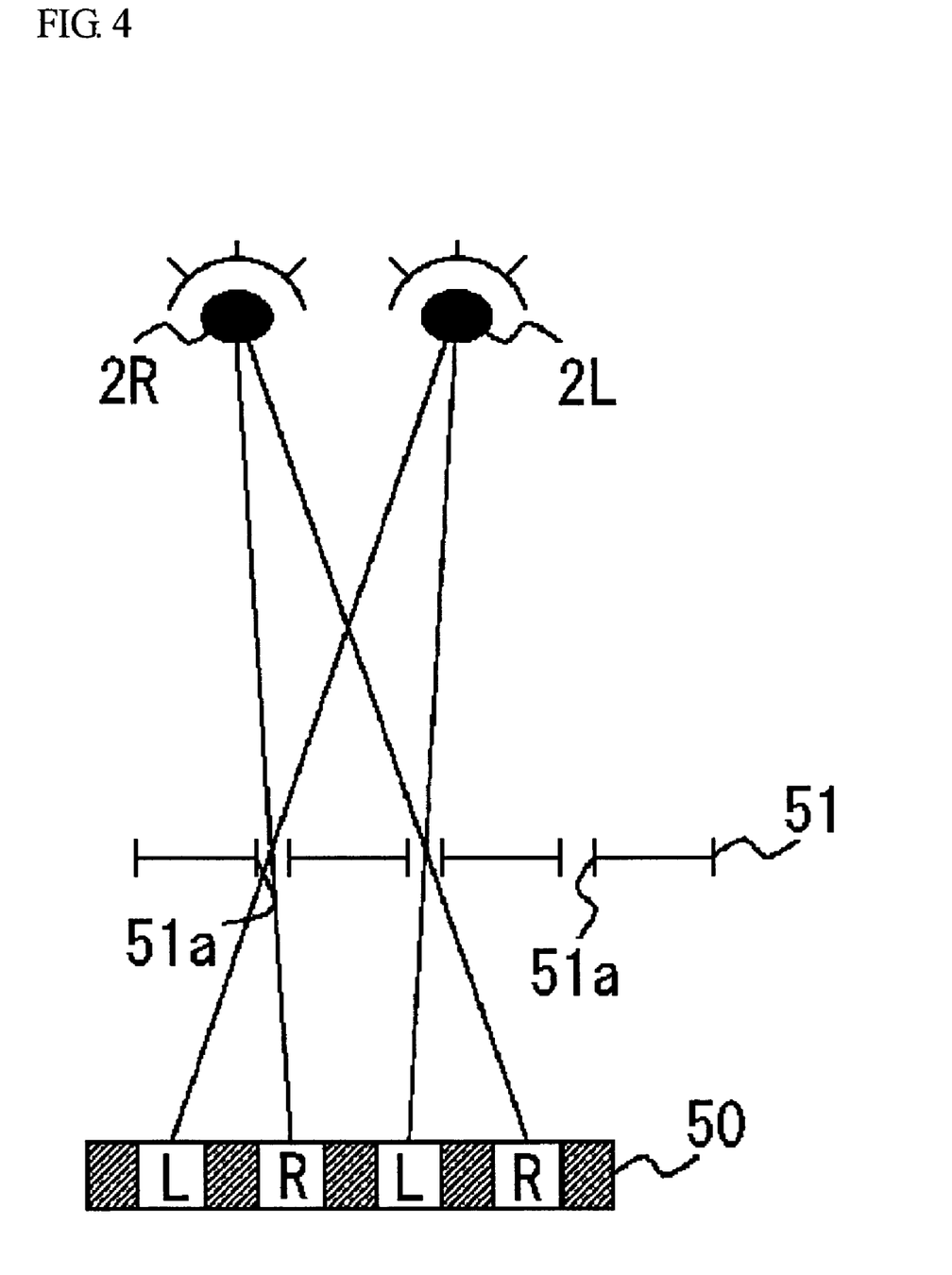
FIG. 4 is a schematic view showing the principal of the stereoscopic image display device based on the parallax barrier method.

FIG. 4 is a schematic view showing the principle of stereoscopic image display based on the parallax barrier method. Images that an observer ca view are formed on a liquid crystal display panel 50. To realize stereoscopic vision, left-eye-pixels L for displaying images for the left eye and right-eye-pixels R for displaying images for the right eye are alternately arrayed on the liquid crystal display panel 50. For example, the left-eye-pixels L and the right-eye-pixels R can be obtained by simultaneously taking images using two cameras for the left eye and the right eye, or, alternatively, by calculating theoretically based on data pertaining to one image. Both pixels obtained in this manner contain parallax information necessary for a person to achieve stereoscopic perception by binocular parallax.

Alight-shielding parallax barrier 51 is arranged in front of the liquid crystal display panel 50. Openings 51a are formed on the parallax barrier 51 in the form of vertical stripes. Gaps between the openings 51a are set corresponding to the array of left-eye-pixels L and right-eye-pixels R. Images for the left eye and images for the right eye are separated into right and left by the parallax barrier 51, and the separated images severally enter the left eye 2L and right eye 2R of the observer, enabling him to view stereoscopic images.

A stereoscopic image display device according to the above-described liquid crystal parallax barrier method is disclosed in Japanese Laid-Open Patent Publication No. 3-119889, for example, and description will be made thereof hereafter, using FIG. 5.

Figure 5:
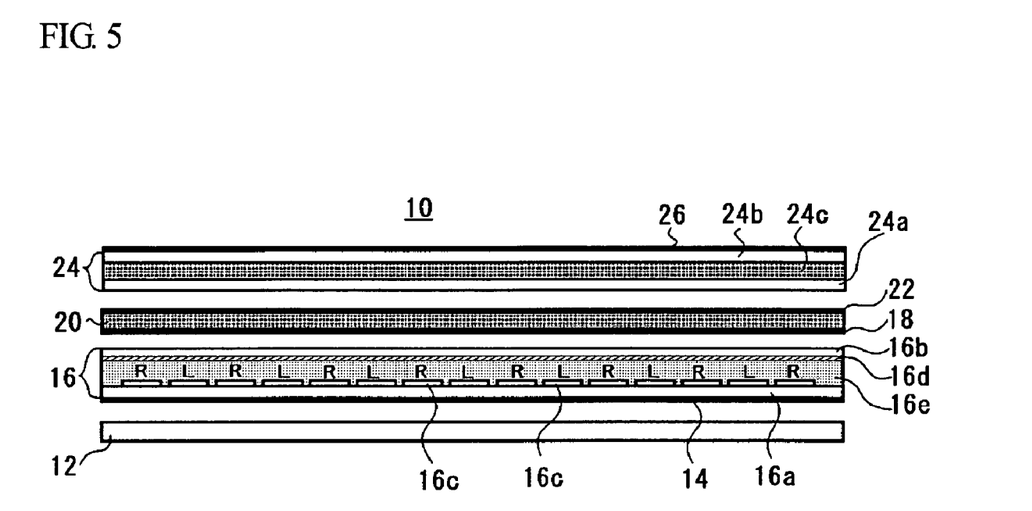
FIG. 5 is a schematic cross-sectional view of an example of the stereoscopic image display device disclosed in Japanese Laid-Open Patent Publication No. 3-119889.

FIG. 5 is a schematic cross-sectional view of a stereoscopic image display device 10 based on the parallax barrier method, which includes a liquid crystal parallax barrier arranged in front of a liquid crystal panel as an image display device. In FIG. 5, a transmissive liquid crystal panel 16, on which display pixels are arrayed via the first polarizing plate 14, is arranged on the surface of a backlight 12, while a liquid crystal parallax barrier 24 is further arranged via the second polarizing plate 18, the glass spacer 20 and the third polarizing plate 22, and the fourth polarizing plate 26 is arranged on the surface of the liquid crystal parallax barrier 24.

The transmissive liquid crystal panel 16 consists of a rear glass plate 16a located on the incident side of light, a front glass plate 16b located on the output side of light, pixel electrodes 16c formed on the inner side of the rear glass plate 16a, a color filter 16d formed on the inner side of the front glass plate 16b, and liquid crystal 16e filled and sealed between the rear glass plate 16a and the front glass plate 16b. Respective images for the right eye and the left eye are alternately displayed on the transmissive liquid crystal panel 16.

In the liquid crystal parallax barrier 24, liquid crystal 24c is inserted into the sealed space sandwiched between the two glass plates 24a, 24b, on the inside of which stripe-shaped electrodes and opposite electrodes (not shown) are respectively formed parallel with the stripes of the pixels L and R of the transmissive liquid crystal panel 16, and the barrier performs display of 2D images under a no voltage applied state and display of 3D images under a voltage applied state. Specifically, the liquid crystal parallax barrier 24 specifies its XY addresses by control means such as a microcomputer, and forms barrier stripes of an arbitrary shape at an arbitrary position on a barrier plane in the case of 3D display.

However, the barrier stripes in the form of vertical stripes are generated only when 3D images are displayed, and the drive of the barrier is controlled to arrest the generation of barrier stripes and to achieve a transparent and colorless state for the entire image display region when displaying 2D images.

The glass spacer 20 using a glass substrate is arranged as a spacer member between the liquid crystal panel 16 for display and the liquid crystal parallax barrier 24. The liquid crystal panel and the spacer member, and the spacer member and the liquid crystal parallax barrier are bonded by double-faced tape at the peripheral edge portions of the panel.

In the stereoscopic image display device, it is necessary to widen the gap between the liquid crystal panel 16 for display and the liquid crystal parallax barrier 24 as the screen of the display device becomes larger. Specifically, to observe displayed binocular parallax images, it is necessary to provide for a fixed range for the distance between the liquid crystal panel for display and the liquid crystal parallax barrier to obtain good stereoscopic images, and such distance must be increased as the distance between the observer and the screen becomes larger as a result of increase in screen size. In other words, the distance is shorter in the case of a small device applied to a cell phone, but naturally becomes larger when used in a TV set or the like.

As the means for adjusting the gap between the liquid crystal display panel and the liquid crystal parallax barrier, in the stereoscopic image display device described in Japanese Laid-Open Patent Publication No. 3-119889 publication, the glass substrate or acrylic plate serving as the spacer member is arranged between the liquid crystal display panel and the liquid crystal parallax barrier, and the gap between the liquid crystal display panel and the liquid crystal parallax barrier accordingly conforms to the thickness of the spacer member. The spacer member must either be a glass substrate or an acrylic plate because it must be capable of transmitting illumination light coming from the backlight.

DISCLOSURE OF THE INVENTION

In the above-described stereoscopic image display device, the gap between the liquid crystal display panel and the liquid crystal parallax barrier may be small when the display device is small and not much consideration is given to the spacer member. However, the gap between the liquid crystal display panel and the liquid crystal parallax barrier must be bigger as mentioned above as the stereoscopic image display device becomes larger. For example, a gap of about 5 mm is required for a 40-inch display screen. Consequently, the transparency and production cost of the spacer member must be given consideration.

Further, heat generated by the backlight used in the stereoscopic image display device causes thermal expansion of the liquid crystal parallax barrier, the spacer member, and the glass substrate used in the liquid crystal display panel. Furthermore, since the distance from the backlight is different for each glass substrate, the glass substrates are consequently bent due to varying thermal expansion rates, and because the stereoscopic image display device is formed by stacking the liquid crystal parallax barrier, the spacer member, the liquid crystal display panel, the polarizing plate and the like in a plurality of steps, such bend in the substrate due to thermal expansion adversely affects the surface flatness of each such member, and necessarily worsens the display quality of the stereoscopic image display device. Therefore, the stereoscopic image display device of the above-described Japanese Laid-Open Patent Publication No. 3-119889 does not provide a display device with sufficient display quality where the light-transmitting member such as the above-mentioned spacer member is simply arranged between the liquid crystal display panel and the liquid crystal parallax barrier.

As a result of various studies, the inventor of the present invention has found that the afore-stated problems can be solved by forming the glass substrate constituting the liquid crystal display panel with non-alkali glass material and by forming the spacer member with glass material different from that of the glass substrate constituting the liquid crystal display panel in the stereoscopic image display device based on the liquid crystal parallax barrier method.

Specifically, the present invention aims to address the above-described problems, particularly, to provide a stereoscopic image display device which can be used in a large-sized stereoscopic image display device based on the liquid crystal parallax barrier method, with good display quality, and where thermal expansion of the substrate caused by heat generated by the backlight is given consideration, and the method of manufacturing the device.

The above-described objects of the present invention can be achieved by the following constitution. Specifically, the stereoscopic image display device according to the present invention consists of the backlight, the liquid crystal display panel, the liquid crystal parallax barrier, and the spacer member arranged between the liquid crystal display panel and the liquid crystal parallax barrier, in which the device is characterized in that the spacer member consists of a glass material different from that of the glass substrate constituting the liquid crystal display panel.

According to such constitution, it is possible to regulate deformation caused by thermal expansion of the glass substrate made of non-alkali glass constituting the liquid crystal display panel as well as the spacer member due to heat generated by the backlight. Therefore, it is preferable that the spacer member comprise a glass substrate having a thermal expansion coefficient larger than that of the glass substrate constituting the liquid crystal display panel.

Further, the stereoscopic image display device according to the present invention is characterized in that the spacer member is formed of soda glass, while the glass substrate constituting the liquid crystal display panel comprises non-alkali glass. By employing a soda glass substrate, the spacer member can be made more transparent, which is not the case when other materials such as acrylic resin are used, and any increase in production cost can be controlled. Further, soda glass has certain advantages, i.e., it is not easily degraded or deformed, has a high degree of flatness, and is less likely to scratch other stacking members, and thus, a stereoscopic image display device with a suitable spacer member can be provided.

Furthermore, the device is characterized in that the entire peripheral edge portions of the liquid crystal display panel and the spacer member and the entire peripheral edge portions of the spacer member and the liquid crystal parallax barrier are adhered by an adhesive agent, and a negative pressure region is formed between the liquid crystal display panel and the spacer member as well as between the spacer member and the liquid crystal parallax barrier. The stereoscopic image display device is further characterized in that the adhesive agent is coated on the peripheral edge portion of the liquid crystal display panel other than the display region thereof.

A large-sized stereoscopic image display device constituted in this manner is preferable, since the parts can be fixed more firmly as compared to the conventional fixing method of using double-sided adhesive tape. In addition, the region formed by the spacer member, the liquid crystal parallax barrier and the adhesive agent, and the region formed by the spacer member, the liquid crystal display panel and the adhesive agent are formed as negative pressure regions, so that gaps between the members can be stabilized and bend formation due to thermal expansion associated with heat generated by the backlight can be controlled.

Further still, an opening is partially formed in the region where the adhesive agent is not coated, while a sealing member is applied to the opening region.

Further, in the manufacturing method for a stereoscopic image display device according to the present invention, where the display device consists of the liquid crystal display panel, the liquid crystal parallax barrier, and the spacer member that is disposed between the liquid crystal display panel, and the liquid crystal parallax barrier is made of glass material different from that of the glass substrate constituting the liquid crystal display panel, in which the method is characterized by the following steps of: coating the adhesive agent on at least one of the peripheral edge portions of the liquid crystal display panel and the spacer member and on at least one of the peripheral edge portions of the spacer member and the liquid crystal parallax barrier so as to form an opening region where the adhesive agent does not reside on at least one area of the peripheral edge portion; bonding the liquid crystal display panel to the spacer member, bonding the spacer member to the liquid crystal parallax barrier, and curing the adhesive agent; deaerating the space between the liquid crystal panel for display and the spacer member as well as the space between the spacer member and the liquid crystal parallax barrier from the said opening region; and sealing the opening region. In this manufacturing method, the step of coating the adhesive agent refers to coating the agent on a peripheral edge portion of the liquid crystal display panel other than the display region thereof.

Further, producing the stereoscopic image display device through this manufacturing method is easier compared to the conventional operation of adhering by the use of double-sided adhesive tape because only one coating of adhesive agent is required, and bubbles do not occur, yet the parts are more firmly fixed. Further, the region formed by the spacer member, the liquid crystal parallax barrier and the adhesive agent, and the region formed by the spacer member, liquid crystal panel for display and the adhesive agent are formed as negative pressure regions, so that gaps between the members can be stabilized and bend formation due to thermal expansion associated with heat generated by the backlight can be controlled.

BRIEF DESCRIPTION OF THE DRAWINGS

FIG. 1(a) is a schematic cross-sectional view thereof and FIG. 1(b) is an enlarged view of the portion marked A of FIG. 1.

FIG. 2(a) is a view showing the direction of thermal stress, and FIG. 2(b) is a view schematically showing panel distortion caused by thermal expansion;

BEST MODE FOR CARRYING OUT THE INVENTION

Figure 1:
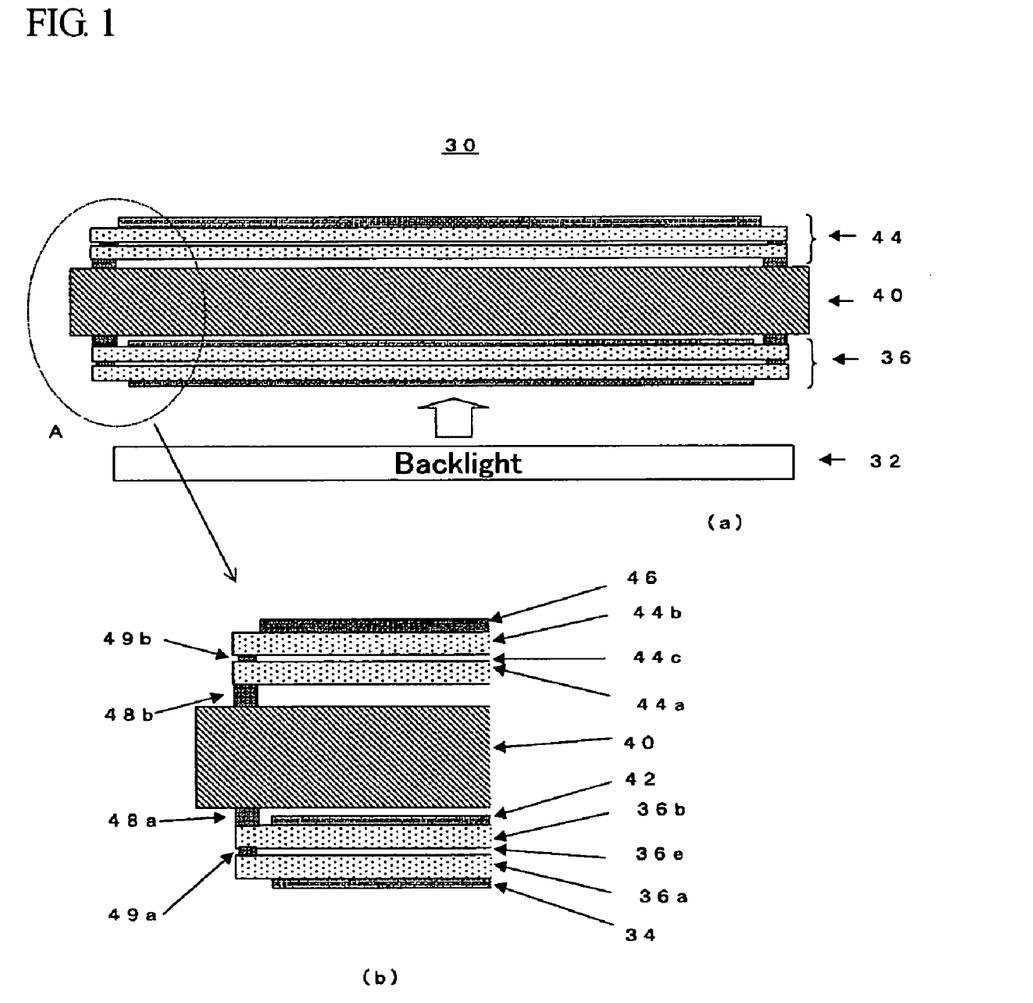
FIG. 1 is a view showing the constitution of the stereoscopic image display device according to the present invention, where

In the following, embodiments of the stereoscopic image display device according to the present invention will be described with reference to the attached drawings. FIG. 1 is the view showing the constitution of a stereoscopic image display device 30 according to the present invention, where FIG. 1(a) is a schematic cross-sectional view thereof and FIG. 1(b) is the enlarged view of the portion marked A of FIG. 1. The stereoscopic image display device 30 according to the present invention is constituted by arranging a liquid crystal display panel 36 and a liquid crystal parallax barrier 44, adhered together by an adhesive agent while sandwiching a spacer member 40 such as a glass substrate, above a backlight 32.

The liquid crystal display panel 36 is a transmissive liquid crystal panel consisting of a rear glass plate 36a located on the incident side of light, a front glass plate 36b located on the output side of light, pixel electrodes (not shown) formed on the inner side of the rear glass plate 36a, a color filter (not shown) formed on the inner side of the front glass plate 36b, and liquid crystal 36e filled between the rear glass plate 36a and the front glass plate 36b and sealed by a sealing member. Images for the right eye and images for the left eye are alternately displayed on the liquid crystal panel 36 for display when performing stereoscopic display, while normal images are displayed when stereoscopic display is not performed.

Although the liquid crystal parallax barrier 44 may comprise either a simple matrix driving type used in a conventional liquid crystal display device or an active matrix driving panel type, complicate wirings or the like need to be arranged on the substrate and it is thus highly likely that yield ratio will be reduced accordingly.

For this reason, in the liquid crystal parallax barrier 44, out of a pair of transparent glass plates 44a, 44b sandwiching liquid crystal 44c, transparent electrodes such as ITO are formed on the entire surface of the glass substrate 44a, and transparent electrodes are likewise formed on the other glass substrate 44b except for a certain portion thereof that must remain transmissive. Then, liquid crystal is set by orientation in which all light is allowed to pass when driving voltage is not applied to the electrodes. Under this configuration, that portion where the transparent electrodes are formed becomes the light-shielding portion when driving voltage is applied, while that portion where the transparent electrodes are made to reside only on one substrate becomes the transmissive portion for light to pass.

Since such a liquid crystal parallax barrier 44 merely requires that transparent electrodes be made not to reside on a certain portion of the glass substrate to provide for light transmission, it can be manufactured by a relatively simple process, in contrast to a barrier using the liquid crystal panel of active matrix driving type or the like. Moreover, by changing the shape of the area where the transparent electrodes are not formed, the shape or position of the transmissive portion can be freely changed relatively.

The backlight 32 is a direct type using a plurality of cold cathode tubes to realize a high level of brightness. Particularly, since the stereoscopic image display device requiring the spacer member 40 has a large display device, the direct type backlight is used instead of the so-called sidelight type backlight usually used in middle-sized or small-sized liquid crystal display devices because of insufficient brightness. Further, when the parallax barrier method is employed, the sidelight type backlight is insufficiently bright when it is switched to stereoscopic display because a certain amount of light is shielded by the barrier, although it is sufficiently bright for 2D display, so that the direct type backlight capable of achieving a high level of brightness is used. Then, constituent members such as the backlight 32, the liquid crystal panel 36 for display, the spacer member 40, and liquid crystal parallax barrier 44 are fixed by an adhesive agent or adhesive tape, and housed in a proper case after the side surfaces and rear surfaces are held together by a frame member. Meanwhile, in the above-described stereoscopic image display device of prior art, the liquid crystal panel for display and the spacer member, and the spacer member and the liquid crystal parallax barrier are generally bonded by double-sided adhesive tape at the peripheral edge portions of the panel, and this being the case, the adhering of the parts is not very secure because the adhering strength of double-sided adhesive tape is insufficient when the screen of the display device becomes larger.

In addition, adhesion of the large-sized liquid crystal display panel, the liquid crystal parallax barrier and the entire surface of the spacer member made of glass through the use of double-sided tape without the development of bubbles between the adhesive tape and each such member, which adversely affects the quality of display, is difficult to avoid. A proposed method of adhering the liquid crystal panel for display and the spacer member together, and the spacer member and the liquid crystal parallax barrier, will hereafter be described.

While the rear glass plate 36a and the front glass plate 36b which constitute the liquid crystal display panel 36 must have the qualities of good transparency, resistance to degradation and deformation and high flatness, TFT driving elements, pixel electrodes, opposing electrodes, color filters and the like, which need to be formed on the panel, must be chemical resistant. For this reason, the rear glass plate 36a and the front glass plate 36b must be of non-alkali glass material because elusion of alkali from glass could adversely affect TFT performance. Similarly, the above-mentioned requirements apply to the glass plates 44a, 44b that constitute the liquid crystal parallax barrier 44. While various kinds of materials and processing methods have been devised to address the problem of reducing the thermal expansion coefficient of non-alkali glass used for the liquid crystal panel in order to avoid deformation due to heat generated during TFT film production, their cost has been prohibitive.

On the other hand, the gap between the liquid crystal display panel 36 and the liquid crystal parallax barrier 44, in which the spacer member 40 is arranged must be wider as the display device becomes larger as described above, and a gap of about 5 mm would be necessary for example, in the case of a 40-inch display screen. Consequently, the transparency and production cost of the spacer member must be taken into account.

Further, the effect of heat coming from the backlight 32 used in the stereoscopic image display device 30 must also be considered, especially in the case of the direct type of backlight involving a plurality of cold cathode tubes, in which a high degree of heat is generated. Moreover, since each of the liquid crystal panel 36 for display and the liquid crystal parallax barrier 44 use two substrates, each of them would constitute four substrate surfaces, while the spacer member 40 has two substrate surfaces, such that the resulting stereoscopic image display device 30 constituted by stacking them would therefore involve at least ten substrate surfaces. Accordingly, the impression of a Newton ring, or what appears like a moire or the like occurs depending on the flatness of the surface of each member or due to manufacturing flaws, significantly affecting the display quality of the device.

In the stereoscopic image display device 30 according to the present invention, the glass plates 36a, 36b, 44a, 44b of the liquid crystal display panel 36 and the liquid crystal parallax barrier 44 consist of non-alkali glass, while the spacer member 40 consists of a different glass material.

For the spacer member 40, it is preferable to use glass material having a thermal expansion coefficient larger than that of the non-alkali glass plates 36a, 36b, 44a, 44b. This is because the liquid crystal display panel 36 is disposed immediately above the backlight 32 while the spacer member 40 is arranged on the liquid crystal display panel 36, and thus the heat generated by the backlight 32 largely affects the glass substrates 36a, 36b constituting the liquid crystal display panel 36 rather than the spacer member 40.

Figure 2:
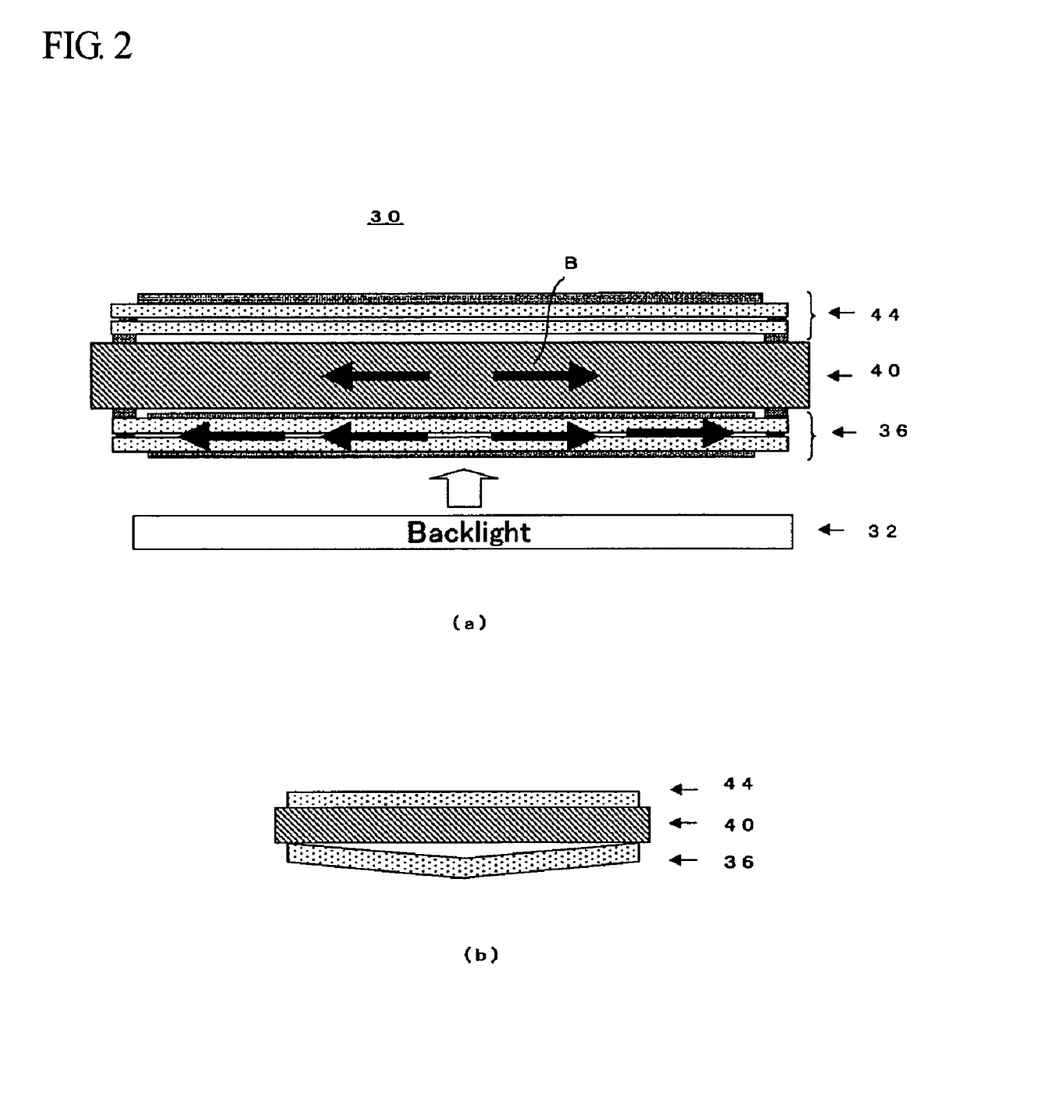
FIG. 2 is a schematic view showing thermal stress caused by the heat generated by the backlight, where

FIG. 2 is a schematic view showing thermal stress caused by the heat generated by the backlight 32, where FIG. 2(a) shows the direction of thermal stress, while FIG. 2(b) illustrates distortion of the panel caused by thermal expansion. As will be noted in FIG. 2, where the spacer member 40 and the glass substrates 36a, 36b comprise the same glass material, thermal expansion of the glass substrates 36a, 36b is larger than that of the spacer member 40, giving rise to distortion at the portion where the spacer member 40 and the glass substrate 36b are bonded by adhesive agent or the like, thereby causing reduction of display quality.

By using the spacer member formed of glass material with a thermal expansion coefficient larger than that of the glass substrates 36a, 36b constituting the liquid crystal display panel 36 as described above, the adverse effect of heat coming from the backlight 32 is reduced. Specifically, the difference between the degree of expansion of the liquid crystal display panel 36 near the backlight 32 and the degree of expansion of the spacer member 40 that is disposed further away from the backlight 32 is minimized, so that distortion at the junction of the spacer member 40 and the glass substrate 36b is also reduced.

Soda glass, which has a larger thermal expansion coefficient compared to non-alkali glass, can be used as glass material for the glass substrates 36a, 36b. The thermal expansion coefficient of soda glass, which is generally about $85 \times 10^{-7}/°$ C. to $95 \times 10^{-7}/°$ C. (0 to 300° C.), is sufficiently larger than the thermal expansion coefficient of non-alkali glass, which is $30 \times 10^{-7}/°$ C. to $50 \times 10^{-7}/°$ C. (0 to 300° C.). Further, soda glass has many advantages because it is inexpensive, has good transparency and a high degree of flatness, and is less prone to degradation due to heat and manufacturing flaws, and is therefore suitable as material for the spacer member of the stereoscopic image display device.

Aside from non-alkali glass, note that borosilicate glass having the thermal expansion coefficient of about $30 \times 10^{-7}/°$ C. (0 to 300° C.) can be used as glass material for the glass substrates 36a, 36b.

Figure 3:
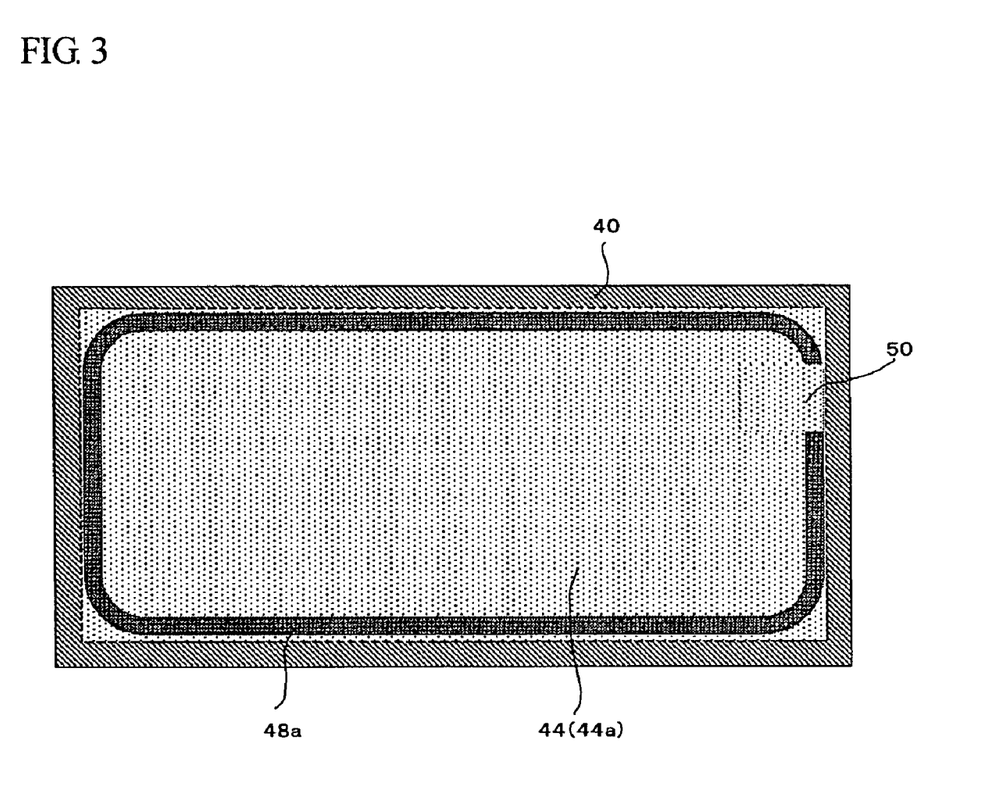
FIG. 3 is a schematic view showing a sectional plane of a substrate junction portion of the stereoscopic image display device according to the present invention.

FIG. 3 is a schematic view showing a sectional plane of the substrate junction portion of the stereoscopic image display device 30 shown in FIG. 1. The peripheral edge portion of the liquid crystal display panel other than the display region thereof is coated with thermosetting or UV-cure adhesive 48a (48b) on the spacer member 40, while the liquid crystal display panel 36 liquid crystal parallax barrier 44) is adhered by the UV-cure adhesive 48a (48b). Using existing facilities, a thermosetting or UV-cure sealing member, which has superior mechanical adhesive strength and is capable of absorbing environmental changes of temperature and humidity without any destabilizing effect, can be applied as a suitable adhesive agent 48a (48b). Then, an opening region 50, which is a certain area of the peripheral edge portion of the liquid crystal display panel upon which the adhesive agent 48a (48b) is not coated, is formed.

The adhering process is performed as follows. Firstly, on the spacer member 40, the adhesive agent 48a (48b) comprising the thermosetting or UV-cure sealing member is coated on the peripheral edge portion of the liquid crystal display panel other than the display region thereof, in such manner as to form an opening region 50 without any coating.

Next, the spacer member 40 is bonded to the liquid crystal display panel 36 (liquid crystal parallax barrier 44), and the adhesive agent 48a (48b) is made to harden. After hardening, the air created by the spacer member 40, the liquid crystal panel 36 for display liquid crystal parallax barrier 44) and the adhesive agent 48a (48b) is expelled from the opening region 50. Finally, the opening region 50 made by the spacer member 40, the liquid crystal panel 36 for display (liquid crystal parallax barrier 44) and the adhesive agent 48a (48b) is sealed by a sealing member to maintain the negative pressure of the inner portion thereof. Meanwhile, the sealing member may be a member capable of sealing the opening region 50 without fail, and any one of UV-curable resin, acrylic resin, one-component or two-component epoxy resin, or the like would be suitable in terms of high mechanical adhesive strength, good absorption of environmental changes of temperature and humidity without being destabilized, and facility of application with the use of existing facilities. When the opening region 50 is deaerated in this manner, it is possible to prevent the air from expanding due to heat generated by the backlight during use of the stereoscopic image display device 30. Note that the air is not necessarily expelled completely during deaeration, where about 80 kPa or less is good enough although 50 kPa or less is preferable. In addition, when adhering the liquid crystal panel for display to the spacer member and adhering the latter to the liquid crystal parallax barrier, disposing spherical spacers in a scattered manner in the area between the liquid crystal panel for display and the spacer member as well as the area between the spacer member and the liquid crystal parallax barrier effectively maintains the uniformity of distance between such members.

As described above, according to the stereoscopic image display device of the present invention, it is possible to control deformation of the glass substrates and the spacer member which constitute the liquid crystal display panel due to thermal expansion caused by heat generated by the backlight. Transparency is assured when a glass substrate as spacer member whose thermal expansion coefficient is larger than that of the glass substrate constituting the liquid crystal display panel is used, and is particularly made of soda glass material, rather than acrylic resin, while at the same time controlling any increase in production cost.

Further, soda glass has certain advantages in that it is not easily prone to degradation and manufacturing flaws and has a high degree of flatness, and is therefore suitable for use as spacer member for a stereoscopic image display device.

Furthermore, since the spacer member 40 is adhered to the liquid crystal parallax barrier 44, and the spacer member 40 is adhered to the liquid crystal display panel 36 by the adhesive agent 48b, 48a, there is no need to use double-sided adhesive tape to perform the adhering process, which makes for a simpler manufacturing method while allowing the parts to be fixed more firmly. Moreover, the region formed by the spacer member 40, the liquid crystal parallax barrier 44 and the adhesive agent 48b, and the region formed by the spacer member 40, the liquid crystal display panel 36 and the adhesive agent 48a become negative pressure regions, so that gaps between the members of the device remain stable such that any bend formation or distortion caused by thermal expansion associated with heat generated by the backlight 32 can be controlled.

What is claimed is:

1. A stereoscopic image display device, comprising:
   a backlight;
   a liquid crystal display panel;
   a liquid crystal parallax barrier; and
   a spacer member arranged between the said liquid crystal display panel and the said liquid crystal parallax barrier,
   wherein the said spacer member consists of a glass material different from that of the glass substrate constituting the said liquid crystal display panel; and
   wherein the entire peripheral edge portions of the said liquid crystal display panel and the said spacer member and the entire peripheral edge portions of the spacer member and the liquid crystal parallax barrier are adhered together by an adhesive agent; and
   wherein a negative pressure region is formed between the said liquid crystal display panel and the said spacer member as well as between the spacer member and the liquid crystal parallax barrier.

2. The stereoscopic image display device according to claim 1, wherein the said adhesive agent is coated on the peripheral edge portion of the liquid crystal display panel other than the display region thereof.

3. The stereoscopic image display device according to claim 1, wherein an opening region is formed on a portion of the said adhesive agent, and a sealing member is coated on the opening region.

4. The stereoscopic image display device according to claim 3, wherein the said sealing member is any one of UV-cure resin, acrylic resin and epoxy resin.

5. The stereoscopic image display device according to claim 1, wherein the said adhesive agent is either a thermosetting sealing member or an UV-cure sealing member.

* * * * *